(No Model.)
W. B. TATMAN & W. C. DAVIS.
SWINGING GATE.
No. 254,407. Patented Feb. 28, 1882.
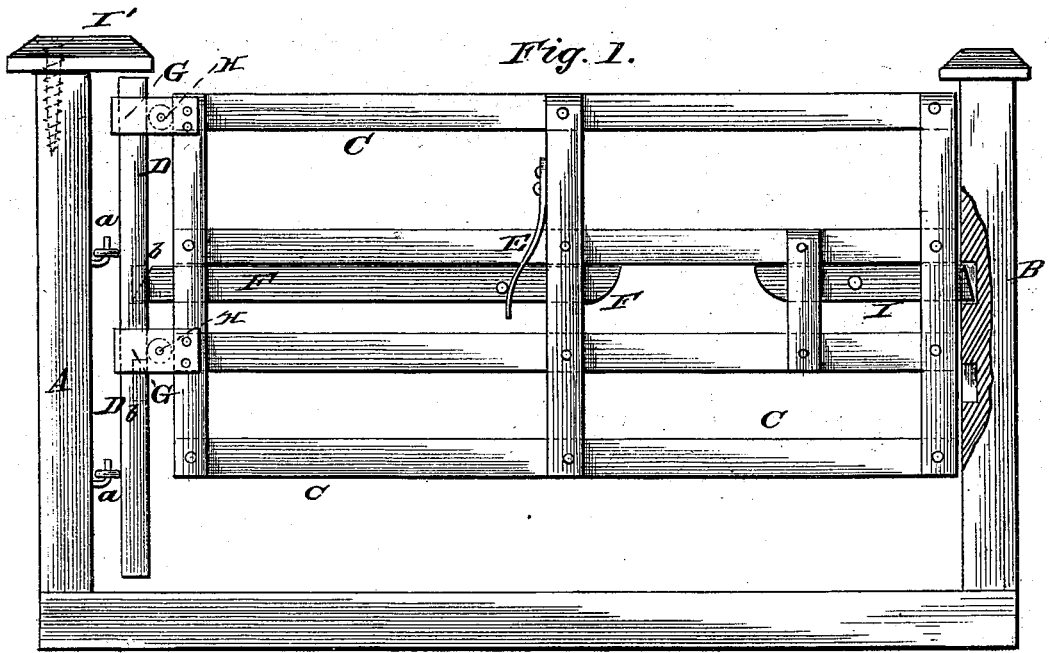
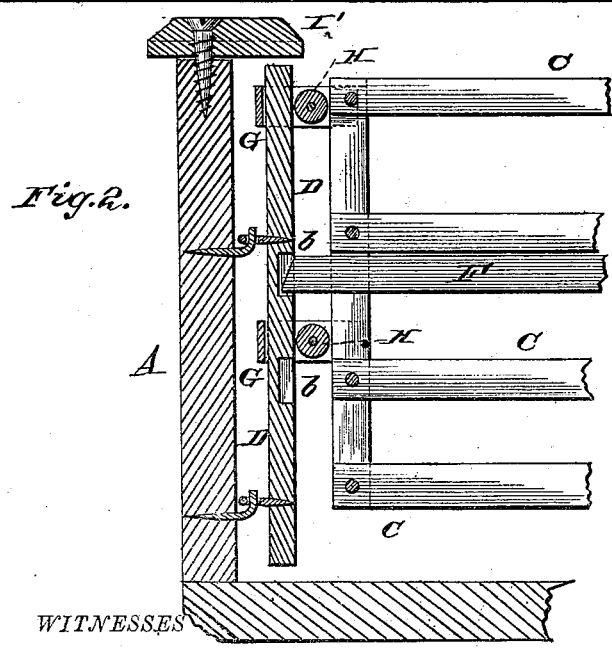
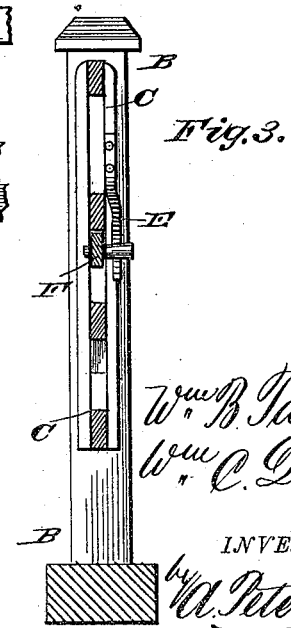
WITNESSES
Fred. G. Dieterich
P. C. Dieterich
INVENTORS
Wm. B. Tatman,
Wm. C. Davis,
by A. Peterson
Attorneys

UNITED STATES PATENT OFFICE.

WILLIAM B. TATMAN AND WILLIAM C. DAVIS, OF FAIRFIELD, IOWA.

SWINGING GATE.

SPECIFICATION forming part of Letters Patent No. 254,407, dated February 28, 1882.

Application filed October 20, 1881. (No model.)

*To all whom it may concern:*

Be it known that we, WILLIAM B. TATMAN and WILLIAM C. DAVIS, of Fairfield, in the county of Jefferson and State of Iowa, have invented certain new and useful Improvements in Farm-Gates; and we do hereby declare that the following is a full, clear, and exact description of the invention, which will enable others skilled in the art to which it appertains to make and use the same, reference being had to the accompanying drawings, which form a part of this specification, and in which—

Figure 1 is a side view of our improved gate. Fig. 2 is a vertical section, and Fig. 3 is a vertical transverse section, thereof.

This invention has relation to that class of swinging gates which are capable of vertical adjustment to admit the passage under the gate of small stock, and to enable it to swing or open and close clear of snow or other obstructions; and it consists in certain details of construction, substantially as hereinafter more fully set forth.

Referring to the accompanying drawings, A indicates the hinge-post, and B the latch-post.

C is the gate, which is constructed in the usual manner of several horizontal parallel bars suitably spaced apart and connected together by vertical bars or braces.

D is a vertical bar, which is supported upon the hinge-post A by means of the hinges *a a*, which are of ordinary construction. Upon this bar the gate is supported by means of a pair of loops or brackets, G, between the arms of which rollers H are pivoted, so as to lessen friction in raising and lowering the gate. The hinged bar D is provided with a series of recesses or mortises, *b*, to receive the inner end of a supporting bar or latch, F, arranged to slide horizontally in between vertical uprights and under a horizontal piece of the gate, as clearly seen in the side view of the drawings. The latch or bar F can be operated by hand; but by preference it is operated automatically by a spring, E, adapted to thrust it endwise toward and at its inner end into the coincident recess or mortise in the bar D as the gate is raised. The inner end of the latch or bar F is beveled, so as to guide it readily into the recesses or mortises of the bar D.

At the forward end of the gate is the usual latch or catch, I, for holding the gate closed.

It will be observed that the vertical adjustment of the gate is readily effected by simply lifting the gate until the desired height of mortise has been reached, the spring-latch being intercepted from entering any other mortise, when the said latch will automatically shoot into the coincident mortise or recess, and thus retain the gate at its point of adjustment to permit small stock to pass in and out under it, or to swing clear of snow or other obstruction in opening and closing the gate, whichever may be desired.

I' is a cap pivoted upon the hinge-post, which, while adapted to hold the hinge-bar of the gate down and the gate in proper position, permits of the ready lifting of the gate with its hinge-bar off the hinge-post.

Having thus fully described our invention, we claim and desire to secure by Letters Patent of the United States—

The combination of the gate C, having the latch I, spring-latch F, beveled on its upper side, and the loops G, having frictional rolls H, bar D, having mortises *b*, embraced by the loops G, and hinged to the post A, having the pivoted caps I', overhanging the bar D, and post B, all constructed and arranged to operate as set forth.

In testimony that we claim the foregoing as our own we have hereunto affixed our signatures in presence of two witnesses.

WILLIAM B. TATMAN.
WILLIAM C. DAVIS.

Witnesses:
JAMES MOUCK,
JAMES M. HINKLE.